March 5, 1963  R. A. PELISHEK  3,080,465
HUMIDITY AND TEMPERATURE RESPONSIVE THERMOSTAT
Filed May 22, 1961

INVENTOR.
Roy A. Pelishek
BY
Lieber, Lieber & Nilles
Attorneys

3,080,465
HUMIDITY AND TEMPERATURE RESPONSIVE THERMOSTAT

Roy A. Pelishek, 4419 Washington Road, Kenosha, Wis.
Filed May 22, 1961, Ser. No. 111,513
1 Claim. (Cl. 200—138)

The present invention relates generally to control devices such as thermostats for controlling the effective temperature of an area, and which are responsive to both humidity and temperature of the area to be controlled.

It has heretofore been proposed to regulate the heat input into an area to be controlled, such regulation being dependent on both humidity and temperature conditions in the area, to thereby provide a uniform degree of comfort. That is to say, an increase in the relative humidity in the area is compensated for by a reduction in temperature, and for a lowering of the humidity a rise in temperature is provided.

Conventional control devices of this general character are usually complex and utilize strand hygrometers, interconnecting linkages and numerous other parts, all of which require adjustment and servicing, and frequently malfunction.

Accordingly, the present invention provides an improved control device of the above general type which is simple in construction, economical to produce, and requires a minimum of maintenance, calibration, adjustment, or repair.

A more specific aspect of the invention provides a switch which is carried on and actuated by movement of the temperature responsive element, which further results in a reliable and economical control device.

The device provided by the present invention is particularly adapted for use in controlling the heating unit which supplies heat to the area to be controlled, although it may alternately control the humidity to consequently control the effective temperature of the area.

Another aspect of the invention provides an adjustable lever which is connected directly to the temperature responsive element and by means of which the range of the actuating switch is selected in accordance with an effective temperature scale.

Figure 1:
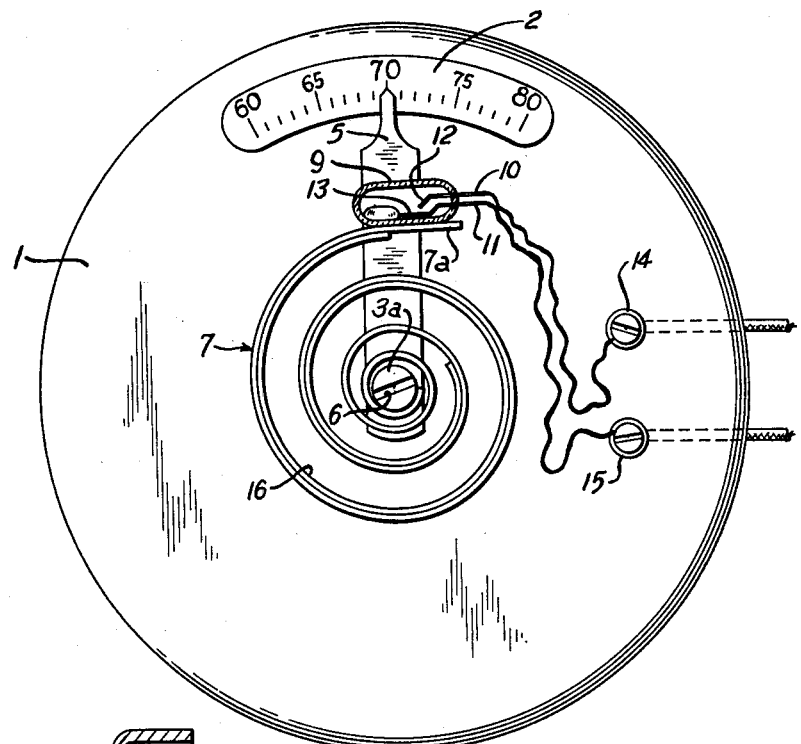
Figure 2:
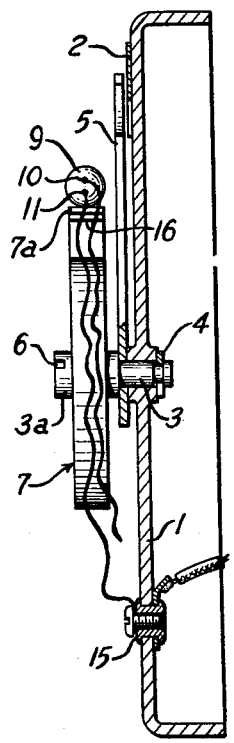

These and other objects and advantages will appear later as this disclosure progresses, reference being had to the accompanying drawings, in which:

FIGURE 1 is a front elevational view of a thermostat made in accordance with the present invention, and FIGURE 2 is a sectional, side elevational view of the FIGURE 1 device.

Referring in greater detail to the drawings, a mounting base 1 has an effective temperature scale 2 thereon which may have any suitable range indicated across its front side. In the drawing shown for illustrative purposes only, a range of between 60 to 80 has been indicated.

A shaft 3 extends through a central portion of the base and is held captive therein by any suitable means such as the split spring washer 4 engaged on the end of the shaft. This shaft 3 has an enlarged portion 3a and it is between the portion 3a and the front face of the base that an adjusting arm 5 is mounted on the shaft. The arm 5 forms a tight friction fit on the shaft, but it can be adjusted relative thereto as follows:

A screwdriver may be inserted in the slot 6 in the front end of the shaft and the shaft and bimetallic element 7 thereby held stationary while the arm is manually rotated on the shaft to an adjusted position in front of the scale.

Thus, in normal operation, the shaft remains stationary in the base and the adjusting arm also remains in its manually adjusted position in respect to the effective temperature scale. Other means may be provided for adjustably securing the arm to the coil.

The bimetallic element 7 is provided for sensing variations in the dry bulb temperature of the surrounding air and is, per se, conventional. This element may be made up of a strip of steel having a strip of copper secured along the inner side thereof. This element is formed as a coil with a sufficient number of turns to cause the desired range of movement of the free end 7a of the coil in accordance with variations in air temperature.

The inner end of the coil is fixed, as by spot welding, to the shaft. The outer or free end of the bimetallic coil has a conventional mercury switch 9 fixed thereto. A pair of wires 10 and 11 extend from their respective contacts 12 and 13 within the switch and to terminals 14 and 15 respectively. The terminals would be connected to the furnace for example, for turning the furnace on or off, to thereby vary the heat input to the area to be controlled.

Cemented or otherwise secured along a substantial portion of the length of the bimetallic coil, and on the inner side thereof, is a moisture sensitive material 16. This material may be one of a number of different substances, such as paper, cellulose or cellulose compounds and is fastened to that side of the bimetal coil which has the greatest temperature coefficient of expansion. The means for securing the material to the metal may be any suitable adhesive, such as latex which will not dry out, stiffen, become brittle, or itself enter materially into the reaction of the elements which make up the entire coil.

The coil, when considered in its entirety, is responsive to both temperature and humidity of the surrounding air and the amount of movement of the free end of the coil is determined by the net effect of both of these conditions. In other words, the coil either winds up or unwinds in accordance with both the temperature and humidity of the air.

As the free end of the coil moves, the switch fixed thereto also moves with it and sufficient movement to the left or counterclockwise as viewed in FIGURE 1 will cause the mercury to leave the contacts and open the circuit to the furnace, thus turning the furnace off. Sufficient movement of the switch to the right causes the contacts to be closed, thus enabling the furnace to supply more heat.

Stated otherwise, when the combined effect of the temperature and humidity in the area is such to cause the switch to open, additional heat is supplied to the area to again bring the effective temperature of the area back to that called for by the setting of the adjustable arm.

When a lower effective temperature of the area is desired from that shown by the position of the arm in FIGURE 1, the arm would be manually moved to the left, thus causing the entire coil and switch to also be rotated bodily and as a unit with the arm and shaft. This adjustment has the effect of necessitating greater movement of the free end of the coil in a clockwise direction before the switch will close.

Conversely, when a higher effective temperature of the area is desired, the arm would be shifted to the right, as viewed in FIGURE 1, and a lesser amount of movement of the free end of the coil is required to close the mercury switch.

The present control device is capable of regulating temperature in accordance with maximum comfort and economy by reducing the demand for heat during a rise in humidity and increasing the heat demand during a drop in humidity. The net result is a lower temperature setting obtainable with a single element or conventional bimetallic thermostat. Greater comfort is assured when the humidity in the room increases.

By means of the present invention, a simple and reliable control device has been provided which regulates the effective temperature or comfort index of an area in accordance with the combined effect of both the temperature and humidity of said area. An increase in the relative humidity in the area is compensated for by a reduction in temperature, and a rise in temperature of the area is provided when the humidity drops.

The present control device is economical to manufacture, trouble-free in operation. Furthermore, the device is easily adjusted and calibrated without the necessity of special tools or disassembly of the unit. By being able to adjust the arm in respect to the shaft and coil, the weight of the switch can be adjusted advantageously to the force of gravity when mounting the device and when calibrating the arm relative to the scale.

Various modes of carrying out the invention are contemplated as being within the scope of the following claim particularly pointing out and distinctly claiming the subject matter which is regarded as the invention:

A humidity and temperature responsive thermostat for controlling the effective temperature of an area by regulating the heat output of a heating unit, said thermostat comprising, a mounting base, an effective temperature scale fixed on said base, a shaft rotatably mounted on said base, a bimetallic coil having an inner end fixed to said shaft, said coil being movable in response to temperature variations of the air in said area, a moisture responsive element secured along said bimetallic coil for a substantial portion of the length of the latter, said coil having a free end, a mercury switch for actuating said heating unit and carried adjacent said free end, said switch being operative by movement of said coil when the combined air temperature and humidity conditions in said area causes said coil to move beyond predetermined limits, and an adjusting arm connected to said shaft for changing the position of said coil and consequently changing the predetermined limits thereof, said arm being freely swingable over said scale to a selected position relative thereto to thereby adjust the limits of switch operation in accordance with the effective temperature selected on said scale by the position of said arm.

References Cited in the file of this patent

UNITED STATES PATENTS

| | | |
|---|---|---|
| 2,509,593 | Goddard | May 30, 1950 |
| 2,759,070 | Ray | Aug. 14, 1956 |
| 2,966,060 | Bradbury | Dec. 27, 1960 |

FOREIGN PATENTS

| | | |
|---|---|---|
| 727,512 | France | Mar. 29, 1932 |